(12) United States Patent
Umansky et al.

(10) Patent No.: US 7,837,861 B2
(45) Date of Patent: Nov. 23, 2010

(54) PROCESS FOR BENZENE REDUCTION AND SULFUR REMOVAL FROM FCC NAPHTHAS

(75) Inventors: Benjamin S. Umansky, Fairfax, VA (US); James F. Stanley, Arlington, VA (US); Tomas R. Melli, Haymarket, VA (US); Sean C. Smyth, Billings, MT (US); Eugene M. Roundtree, Fairfax Station, VA (US)

(73) Assignee: ExxonMobil Research & Engineering Co., Annandale, NJ (US)

( * ) Notice: Subject to any disclaimer, the term of this patent is extended or adjusted under 35 U.S.C. 154(b) by 514 days.

(21) Appl. No.: 11/898,674

(22) Filed: Sep. 14, 2007

(65) Prior Publication Data

US 2008/0116112 A1 May 22, 2008

Related U.S. Application Data

(60) Provisional application No. 60/852,405, filed on Oct. 18, 2006.

(51) Int. Cl.
*C10G 17/00* (2006.01)
*C07C 2/58* (2006.01)

(52) U.S. Cl. .................. 208/208 R; 208/78; 585/446

(58) Field of Classification Search ............. 208/208 R, 208/78; 585/446
See application file for complete search history.

(56) References Cited

U.S. PATENT DOCUMENTS 3,729,409 A 4/1973 Chen (Continued)

FOREIGN PATENT DOCUMENTS

WO 02102935 A1 12/2002

(Continued)

OTHER PUBLICATIONS

International Search Report, PCT/US 07/22030, mailed May 21, 2008.

(Continued)

*Primary Examiner*—Thuan Dinh Dang
(74) *Attorney, Agent, or Firm*—Gerald L. Harris; Malcolm D. Keen; Glenn T. Barrett

(57) ABSTRACT

A process for the removal of sulfur compounds and benzene of a catalytically cracked petroleum naphtha comprising benzene, organic sulfur compounds and olefins, by fractionating the cracked naphtha into a relatively low boiling range, olefinic, light catalytic naphtha (LCN) and an olefinic heavy catalytic naphtha (HCN) which boils above the range of the LCN the boiling ranges of the LCN and the HCN being defined by a cut point selected to maintain most of the benzene in the cracked naphtha in the LCN together with olefins in the boiling range of the LCN. The LCN is subjected to an optional non-hydrogenative desulfurization step followed by a fixed bed alkylation step in which the benzene in the LCN is alkylated with the olefins contained in this fraction. The HCN is treated by a similar an alkylation step using the olefins contained in this fraction to alkylate the sulfur compounds, forming alkylated products which boil above the gasoline boiling range. The LCN and HCN are then fractionated to remove light ends and higher boiling sulfur reaction products (disulfides, alkylated thiophenes) boiling above the gasoline boiling range.

20 Claims, 3 Drawing Sheets

U.S. PATENT DOCUMENTS

| | | | |
|---|---|---|---|
| 3,751,504 | A | 8/1973 | Keown et al. |
| 3,759,821 | A | 9/1973 | Brennan et al. |
| 3,767,568 | A | 10/1973 | Chen |
| 3,957,625 | A | 5/1976 | Orkin |
| 4,016,218 | A | 4/1977 | Haag et al. |
| 4,049,542 | A | 9/1977 | Gibson et al. |
| 4,062,762 | A | 12/1977 | Howard et al. |
| 4,547,605 | A | 10/1985 | Kresge et al. |
| 4,582,815 | A | 4/1986 | Bowes |
| 4,908,120 | A | 3/1990 | Bowes et al. |
| 4,954,325 | A | 9/1990 | Rubin et al. |
| 4,954,663 | A | 9/1990 | Marler et al. |
| 4,962,256 | A | 10/1990 | Le et al. |
| 4,992,606 | A | 2/1991 | Kushnerick et al. |
| 5,001,295 | A | 3/1991 | Angevine et al. |
| 5,043,501 | A | 8/1991 | Del Rossi et al. |
| 5,229,341 | A | 7/1993 | Kresge et al. |
| 5,236,575 | A | 8/1993 | Bennett et al. |
| 5,250,777 | A | 10/1993 | Fishman |
| 5,284,643 | A | 2/1994 | Morrison et al. |
| 5,318,690 | A | 6/1994 | Fletcher et al. |
| 5,334,795 | A | 8/1994 | Chu et al. |
| 5,346,609 | A | 9/1994 | Fletcher et al. |
| 5,360,532 | A | 11/1994 | Fletcher et al. |
| 5,362,697 | A | 11/1994 | Fung et al. |
| 5,382,742 | A | 1/1995 | Morrison et al. |
| 5,599,441 | A * | 2/1997 | Collins et al. ........... 208/208 R |
| 5,865,987 | A | 2/1999 | Borghard et al. |
| 5,985,136 | A | 11/1999 | Brignac et al. |
| 6,013,598 | A | 1/2000 | Lapinski et al. |
| 6,126,184 | A | 10/2000 | Liao |
| 6,231,753 | B1 | 5/2001 | McKnight et al. |
| 6,231,754 | B1 | 5/2001 | Brignac et al. |
| 6,387,249 | B1 | 5/2002 | Cook et al. |
| 6,409,913 | B1 | 6/2002 | Clark et al. |
| 6,596,157 | B2 | 7/2003 | Gupta et al. |

FOREIGN PATENT DOCUMENTS

| | | |
|---|---|---|
| WO | 02102936 A1 | 12/2002 |
| WO | WO 03/048273 | 6/2003 |
| WO | WO 03/099963 | 12/2003 |

OTHER PUBLICATIONS

Written Opinion, PCT/US 07/22030, mailed May 21, 2008.

* cited by examiner

PROCESS FOR BENZENE REDUCTION AND SULFUR REMOVAL FROM FCC NAPHTHAS

CROSS REFERENCE TO RELATED APPLICATIONS

This application claims the priority of U.S. patent application Ser. No. 60/852,405, filed 18 Oct. 2006.

FIELD OF THE INVENTION

This invention relates to a process for the upgrading of hydrocarbon streams. It more particularly refers to a process for upgrading gasoline boiling range petroleum fractions containing substantial proportions of sulfur impurities by reducing the sulfur content and also by removing benzene.

BACKGROUND OF THE INVENTION

Catalytically cracked gasoline currently forms a major part of the gasoline product pool in the United States and it provides a large proportion of the sulfur in the gasoline. The sulfur impurities may require removal, usually by hydrotreating, in order to comply with product specifications or to ensure compliance with environmental regulations, both of which are expected to become more stringent in the future, possibly permitting no more than about 300 ppmw sulfur in motor gasolines; low sulfur levels result in reduced emissions of CO, $NO_x$ and hydrocarbons.

Naphthas and other light fractions such as heavy cracked gasoline may be hydrotreated by passing the feed over a hydrotreating catalyst at elevated temperature and somewhat elevated pressure in a hydrogen atmosphere. One suitable family of catalysts which has been widely used for this service is a combination of a Group VIII and a Group VI element, such as cobalt and molybdenum, on a substrate such as alumina. After the hydrotreating operation is complete, the product may be fractionated, or simply flashed, to release the hydrogen sulfide and collect the now sweetened gasoline.

Cracked naphtha, as it comes from the catalytic cracker and without any further treatments, such as purifying operations, has a relatively high octane number as a result of the presence of olefinic components. In some cases, this fraction may contribute as much as up to half the gasoline in the refinery pool, together with a significant contribution to product octane.

Hydrotreating of any of the sulfur containing fractions which boil in the gasoline boiling range causes a reduction in the olefin content, and consequently a reduction in the octane number and as the degree of desulfurization increases, the octane number of the normally liquid gasoline boiling range product decreases. Some of the hydrogen may also cause some hydrocracking as well as olefin saturation, depending on the conditions of the hydrotreating operation.

Various proposals have been made for removing sulfur while retaining the more desirable olefins. The sulfur impurities tend to concentrate in the heavy fraction of the gasoline, as noted in U.S. Pat. No. 3,957,625 (Orkin) which proposes a method of removing the sulfur by hydrodesulfurization of the heavy fraction of the catalytically cracked gasoline so as to retain the octane contribution from the olefins which are found mainly in the lighter fraction. In one type of conventional, commercial operation, the heavy gasoline fraction is treated in this way. As an alternative, the selectivity for hydrodesulfurization relative to olefin saturation may be shifted by suitable catalyst selection, for example, by the use of a magnesium oxide support instead of the more conventional alumina.

U.S. Pat. No. 4,049,542 (Gibson) discloses a process in which a copper catalyst is used to desulfurize an olefinic hydrocarbon feed such as catalytically cracked light naphtha. This catalyst is stated to promote desulfurization while retaining the olefins and their contribution to product octane.

In any case, regardless of the mechanism by which it happens, the decrease in octane which takes place as a consequence of sulfur removal by hydrotreating creates a tension between the growing need to produce gasoline fuels with higher octane number and—because of current ecological considerations—the need to produce cleaner burning, less polluting fuels, especially low sulfur fuels. This inherent tension is yet more marked in the current supply situation for low sulfur, sweet crudes.

Processes for improving the octane rating of catalytically cracked gasolines have been proposed. U.S. Pat. No. 3,759,821 (Brennan) discloses a process for upgrading catalytically cracked gasoline by fractionating it into a heavier and a lighter fraction and treating the heavier fraction over a ZSM-5 catalyst, after which the treated fraction is blended back into the lighter fraction. Another process in which the cracked gasoline is fractionated prior to treatment is described in U.S. Pat. No. 4,062,762 (Howard) which discloses a process for desulfurizing naphtha by fractionating the naphtha into three fractions each of which is desulfurized by a different procedure, after which the fractions are recombined.

The octane rating of the gasoline pool may be increased by other methods, of which reforming is one of the most common. Light and full range naphthas can contribute substantial volume to the gasoline pool, but they do not generally contribute significantly to higher octane values without reforming. They may, however, be subjected to catalytically reforming so as to increase their octane numbers by converting at least a portion of the paraffins and cycloparaffins in them to aromatics. Fractions to be fed to catalytic reforming, for example, with a platinum type catalyst, need to be desulfurized before reforming because reforming catalysts are generally not sulfur tolerant; they are usually pretreated by hydrotreating to reduce their sulfur content before reforming. The octane rating of reformate may be increased further by processes such as those described in U.S. Pat. No. 3,767,568 and U.S. Pat. No. 3,729,409 (Chen) in which the reformate octane is increased by treatment of the reformate with ZSM-5.

Aromatics are generally the source of high octane number, particularly very high research octane numbers and are therefore desirable components of the gasoline pool. They have, however, been the subject of severe limitations as a gasoline component because of possible adverse effects on the ecology, particularly with reference to benzene. It has therefore become desirable, as far as is feasible, to create a gasoline pool in which the higher octanes are contributed by the olefinic and branched chain paraffinic components, rather than the aromatic components. Environmental regulations related to motor fuels have produced substantial changes in refinery operations. To comply with these regulations, some refineries have excluded the $C_6$ compounds from the reformer feed to satisfy the low-level benzene requirement. A new refinery process able to alkylate benzene and sulfur compounds with the olefins contained in the same gasoline stream would be beneficial not only to meet benzene specification but also to comply with sulfur regulations.

A series of patents originating from Mobil Oil Corp. describe a process for the upgrading of gasoline by sequential hydrotreating and selective cracking steps. In the first step of the process, the naphtha is desulfurized by hydrotreating and during this step some loss of octane results from the saturation of olefins. The octane loss is restored in the second step by a shape-selective cracking, preferably carried out in the presence of an intermediate pore size zeolite such as ZSM-5. The product is a low-sulfur gasoline of good octane rating. The patents in this series are typified by the first, U.S. Pat. No. 5,346,609. Developments of the basic process with alternative methods of sulfur removal intended to further minimize octane loss are U.S. Pat. No. 5,318,690, in which the naphtha is split into two fractions with the light fraction subjected to an extractive sulfur removal operation which preserves olefin content the heavy fraction which contains relatively fewer of the desirable high-octane olefins is desulfurized by hydrodesulfurization and any resulting octane loss is restored by a selective cracking over a zeolite. A further development described in U.S. Pat. No. 5,360,532 uses a final extraction step to remove recombinant mercaptans. When this process is applied to heavy catalytic naphtha (HCN), the yield loss can be between 6 to 15% while maintaining a similar octane value. The yield loss is highly dependent on octane-recovered value and the type of feed. Heavy catalytic naphtha is the ideal stream for this technology as higher losses are obtained with full range or intermediate catalytic naphthas.

A different approach was taken to sulfur removal by Exxon Research and Engineering Company in the selective naphtha hydrofining process described in various patents including: U.S. Pat. No. 5,985,136; U.S. Pat. No. 6,126,184; U.S. Pat. No. 6,231,753; 6,409,913; U.S. Pat. No. 6,231,754; U.S. Pat. No. 6,013,598; U.S. Pat. No. 6,387,249; U.S. Pat. No. 6,596,157. The ExxonMobil selective naphtha naphtha hydrofining process, SCANfining™, which incorporates aspects of the processes described in these patents, which is commercially available under license from ExxonMobil Research and Engineering Company has demonstrated itself to be a very effective naphtha desulfurization process. This selective naphtha hydrofining process was developed for deep hydrodesulfurization with maximum preservation of the olefins (octane). The single stage version of the process can be used with a full range catalytic naphtha or with an intermediate catalytic naphtha (ICN), for example a nominal 65-175° C. (150-350° F.) or a heavy catalytic naphtha (HCN), for example, a nominal 175° C.+ (350° F.+) naphtha, or both. The two-stage version of the process, as described in U.S. Pat. No. 6,231,753, WO 03/048273 and WO 03/099963, adds a second reactor and inter-stage removal of H2S allowing very deep HDS with very good olefin retention. The operation of this process relies on a combination of a highly selective catalyst with process conditions designed to achieve hydrodesulfurization with minimum olefin saturation.

In cases where the sulfur content of the naphtha is modest and very deep HDS is not required, the SCANfining process can be an attractive option. If severe HDS conditions are needed, it is generally better to treat the LCN stream separately to preserve the maximum amount of olefins. Co-pending application U.S. Ser. No. 11/898,675, claiming priority from U.S. Ser. No. 60/852,404, filed 18 Oct. 2006, entitled "Process for selective sulfur removal from FCC naphthas using zeolite catalysts", describes a process in which the cracked naphtha feed is subjected to selective hydrofining to remove sulfur without sacrificing octane (hydrodesulfurization typically around 85%) followed by a downstream alkylation a solid, acidic molecular sieve catalyst under mild conditions to shift sulfur species from the lighter, olefin-rich portions of the naphtha to the heavy, olefin-poor gasoline.

SUMMARY OF THE INVENTION

We have now devised a process scheme to allow the removal of sulfur compounds and reduce benzene content of the FCC catalytic naphthas. The FCC naphtha is fractionated into two fractions, a relatively low boiling range, light catalytic naphtha (LCN) and a heavy catalytic naphtha (HCN) which boils above the range of the LCN. The cut point between the LCN and HCN is selected to maintain most of the benzene in the LCN stream. The LCN stream is treated by an alkylation step in which the sulfur compounds and aromatic compounds including the benzene in the light fraction are alkylated with the olefins contained in this fraction, mainly C4 and C5 olefins. The sulfur compounds are converted to higher boiling alkylation products which may subsequently be removed in order to meet final product specifications while the benzene is converted to alkylaromatics which are acceptable in the gasoline product. In this step of the process is also possible to add additional benzene from other refinery processes. If desired, the light fraction may be subjected to a preliminary mercaptan extraction step to remove most of the mercaptan compounds.

The HCN stream (higher boiling fraction) may be subjected to an alkylation step using the olefins contained in this fraction to alkylate the sulfur compounds and remove them from the gasoline boiling range, as with the treatment of the lighter fraction. The alkylated sulfur compounds can then be removed by fractionation. If desired, a selective catalytic naphtha hydrotreating step may precede the alkylation step to remove the majority (desirably, at least 90%) of the sulfur compounds of the HCN and the alkylation process can then follow to remove the residual sulfur. The alkylation process will alkylate the residual sulfur compounds with the olefins contained in the HCN allowing to high sulfur removal (almost 100%) with small or no octane value reduction.

The present process scheme enables the desulfurization to be carried out in a way which reduces the saturation of the olefins, either by alkylation of the sulfurous compounds to convert them into higher boiling materials outside the gasoline boiling range so that they may be removed by fractionation in the product recovery step or by extraction in a process step which does not affect the desirable, high octane olefins. The alkylation step applied to the higher boiling fraction is similar in purpose but here there is a reduced concern for olefin saturation since the olefins are concentrated in the lighter fraction.

The front end of the cracked feed, which is relatively rich in olefins is spared the saturating effect of the hydrodesulfurization but is nevertheless desulfurized by alkylation and optionally, extraction of the mercaptans. The back end, by contrast, is relatively olefin-poor but high in sulfur compounds such as thiophenes and substituted thiophenes which are not amenable to extraction by conventional extractive processes. This higher-boiling, sulfur-rich fraction is effectively desulfurized by the alkylation followed by fractionation, optionally with the initial selective hydrofining step. The sulfur from thiophenes, substituted thiophenes and other higher boiling sulfur compounds initially present in the higher boiling fraction, if not removed by the initial hydrofining, are subjected to a similar type of alkylation usually in the presence of a zeolite catalyst to convert them into sulfur compounds boiling above the gasoline boiling range.

DRAWINGS

FIG. 1 of the drawings is a schematic of a process unit for carrying out the sulfur/benzene reduction process.

DETAILED DESCRIPTION

Figure 1:
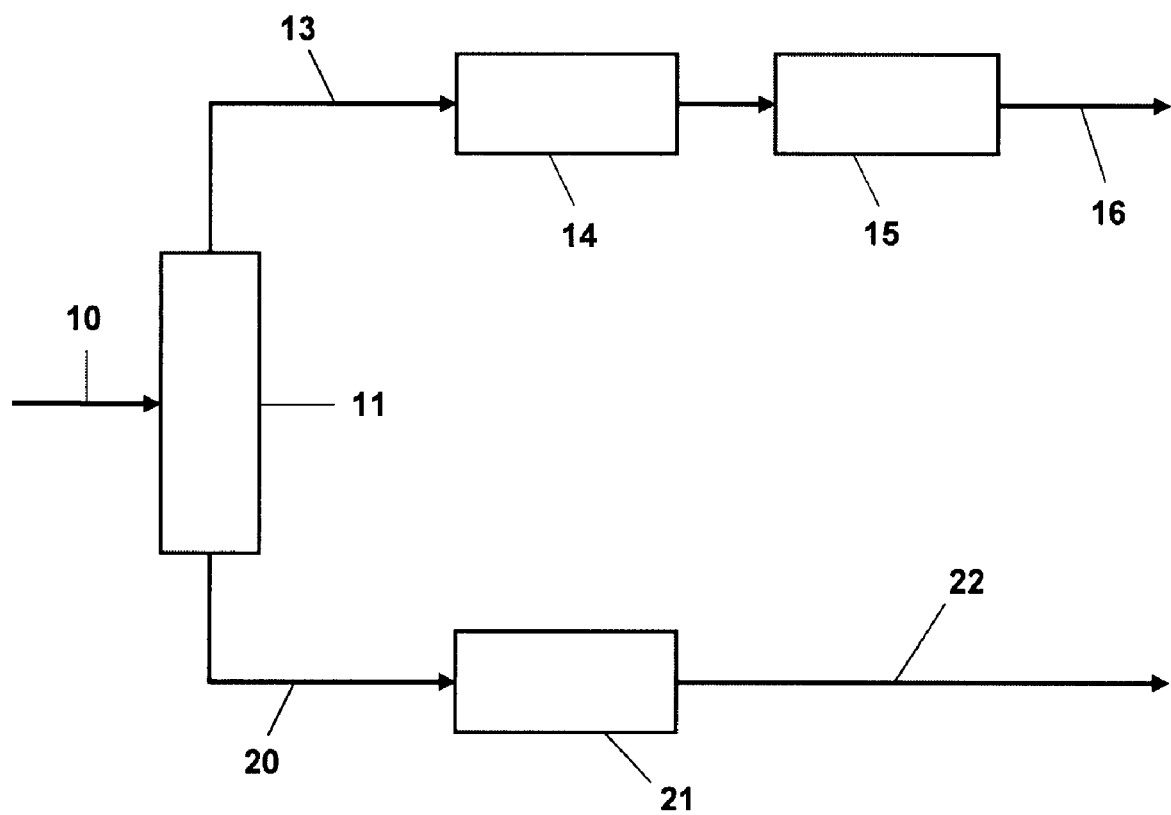

Depending on the refinery operation, there are typically three components in the FCC naphtha: Light Cat Naphtha (LCN), Intermediate Cat Naphtha (ICN) and Heavy Cat Naphtha (HCN). The typical LCN (nominally C5-65° C., C5-150° F.) fraction contains mostly light (C1-C4) mercaptan sulfur species with lesser amounts of carbon disulfide, methylethylsulfide (MES), and dimethylsulfide (DMS). The LCN end point is generally set to ensure that only minimal amounts of thiophene (b.p. 84° C., 183° F.) enter the LCN stream. The typical ICN nominally in the boiling range of 65-175° C. (150-345° F.) contains most of the olefins of the FCC naphtha. Normal hydrotreating process of this stream will drastically affect its octane value. The typical HCN nominally boiling above 177° C. (350° F.) usually contains a higher concentration of sulfur and has the most difficult sulfur species to remove including benzothiophenes and substituted benzothiophenes. Thus, the problems in treating the FCC naphtha can be summarized according to the naphtha fraction: to remove mercaptans from the light naphtha while retaining olefins, to remove benzene, thiophene and other sulfur compounds from the intermediate naphtha again while retaining olefin content and with the heavy naphtha, to remove sulfur including the refractory substituted thiophenes. The mercaptan sulfur can effectively be removed from the light naphtha by extractive processes such as extractive Merox™ (the mercaptan extraction process offered by UOP in which mercaptans are removed using a regenerable caustic solution) or by a mercaptan oxidation process in which the mercaptans are converted to higher boiling disulfides which can be removed by fractionation (Merox™, Caustic-Free Merox™, Merox™ Process, Minalk™ Process from UOP are examples of such processes) without saturating the olefins which should be retained for their desirable effect on product octane. The benzene, however, presents a more difficult problem in that it cannot be readily extracted nor, because of its boiling point close to other desirable components in the naphtha fraction, removed by fractionation. Hydrogenation is not an option because hydrogenation of benzene requires quite severe conditions which would result in complete olefin saturation which major octane loss.

According to the present invention, both the benzene and the sulfur in the front end (lower boiling fraction) of the FCC naphtha are effectively removed by an alkylation process which uses the olefins contained in the naphtha fraction as the alkylating agents. Although this results in some olefin loss, the benzene (octane~100) is converted into alkylbenzenes such as toluene which are of even higher blending octane (toluene octane=120), thereby compensating for the loss of olefins as such. The amount of olefin consumed in the sulfur compound alkylation is normally not large since the proportion of sulfur in the light fraction is fairly low. If, however, the level of sulfur compounds needing to be removed is relatively higher, a preliminary sulfur removal step can be carried out, as described below. Although the sulfur remains in the liquid, the alkylation converts the sulfur compounds to higher boiling materials which can be removed by a subsequent fractionation step.

The sulfur in the back end (heavy naphtha fraction) can be removed in the same way by an alkylation process in which the olefins present in the fraction serve as the alkylating agents for the sulfur compounds, to elevate their boiling points out of the gasoline range so that they can be removed by fractionation in the final product recovery stages.

FIG. 1 shows an illustrative unit configuration for carrying out the present processing scheme. The FCC naphtha from the main column enters the unit by way of line 10, coming into fractionator 11 where it is split into two fractions, a light fraction which passes out through line 13 and a heavy fraction which passes out through line 20. The light fraction passes into reactor 14 in which the sulfur compounds are removed by a process step which has a minimal tendency to saturate the olefins present in this fraction. The extractive Merox process is suitable for this purpose as noted above, besides being economical in operation. The Merox sweetening type processes such as the Minalk process and the oxidative Merox process may also be used provided that a fractionation step follows in the process sequence in order to remove the disulfides and enable the gasoline fraction to meet applicable product sulfur specifications.

In order to remove the benzene, the light fraction passes, after treatment in reactor 14 to a second reactor, 15 in which the benzene is converted to the less toxic alkylbenzenes by a process of alkylation. Also, if the initial sulfur removal step in reactor 14 has been omitted or the sulfur removal has not been complete, the undesirable sulfur compounds may be alkylated in this step to alkyl analogs boiling above the gasoline boiling range which can be separated by fractionation in the common product recovery section.

The heavy catalytic naphtha (HCN) passes from the initial fractionator 11 by way of line 20 to reactor 21 in which it is treated with the objective of removing the sulfur, present mainly as thiophenic compounds which, being readily amenable to alkylation, are likely to be removed almost completely by alkylation followed by fractionation to a suitable end point which retains the alkylthiophenes and other alkylated sulfur species in the fraction above the gasoline fraction. If process conditions are controlled in this step with the objective of alkylating the sulfur compounds while minimizing other alkylation pathways, the loss to the higher boiling kerosene fraction can be minimized. As this higher boiling fraction is conventionally used in the diesel blend pool in which octane is not a requirement, hydrotreating may be used to remove the sulfur compounds with the advantage that the resulting volume expansion will increase the volume of the road diesel blend pool.

If desired the products from reactors 15, 21 may be combined and taken through a common product fractionator but in any event, fractionation of the products will be necessary to stabilize the gasoline range product by removal of light ends resulting from the processing and to remove heavy ends which might contribute to poor combustion qualities and exhaust pollution and which will also contain the higher boiling sulfur compounds produced by alkylation e.g. alkyl sulfur compounds and, if oxidative sulfur removal is used for the light fraction, disulfides or both. By appropriate adjustment of the cut point between the gasoline fraction and the fraction boiling above the gasoline range which is then sent to the catalytic desulfurization unit for hydrogenative sulfur removal. The heavier fractions boiling above the gasoline boiling range which contain alkylated sulfur compounds and, if applicable, higher boiling disulfides may be subjected to hydrotreating to remove the sulfur since octane retention is not a factor with the higher boiling products.

The cut point between the light and heavy fractions produced by fractionator 11 is set so that most of the benzene (b.p. 80.1° C.) in the FCC naphtha is retained in the lower boiling fraction in which it can be treated to convert it to alkylaromatics by alkylation. At the same time, it is desirable to keep the thiophene (b.p. 84° C.) in the heavier fraction Accordingly, the cut point in fractionator 11 is set between 81° and 84° C.; depending on the precision with which the fractionator is capable of meeting cut point, more or less of these two components may be found in one or both streams. Generally, it will be preferable to set the cut point high enough that substantially all the benzene goes into the light fraction even at the cost of having some thiophene come over into this fraction with it, either as a result of setting the cut point too high or an inability to make sharp cuts. Since an alkylation step is carried out on the light fraction, any thiophene brought into this fraction can be alkylated along with the benzene although there is a preference for alkylating it with the higher thiophenes in the heavy fraction since alkylation conditions can be optimized for these components and it is desirable to utilize olefins available in the light fraction for alkylating the benzene. However, if the benzene content of the cracked naphtha is not too high, there may be sufficient olefins present to react with all the benzene as well as thiophene carried into this stream.

Light Fraction

Non-Hydrogenative Desulfurization

As noted above, the light fraction is first routed to an optional desulfurization step in which mercaptan sulfur is removed non-hydrogenatively in order to preserve olefins. The Merox process for mercaptan extraction is a very suitable option here but, as noted above, sweetening processes which convert mercaptan sulfur to higher boiling sulfur compounds which can be removed from the gasoline fraction in a final fractionation step are also options. Other mercaptan extraction processes that may be used at this point include the Exomer™ Process (ExxonMobil), the Merifining™ Process, the Mericat II™ Process and the Thiolex™ Process (Merichem Company). Processes of this type are well-established commercially and appropriate operating conditions are well known. Processes of this type are described, for example, in WO02/102935 and WO02/102936.

Mercaptan extraction processes are good to remove mercaptans. The efficiency of the mercaptans removal is good for $C_3$ and $C_4$ mercaptans (around 100%), around 90 to 95% for $C_5$ mercaptans and it is around 70 to 80% for higher boiling point sulfur species, including mercaptans, sulfide and disulfide compounds. The alkylation of sulfur compounds will more efficient for heavier sulfur compounds. For this reason, the combination of the extraction type process plus the alkylation process makes for a more efficient process.

Benzene Alkylation

The benzene removal step which may also be used to remove sulfur compounds is carried out as a fixed-bed alkylation using a molecular sieve catalyst, preferably a zeolite. The benzene in the light naphtha feed is alkylated by the olefins present in the feeds to produce alkylaromatics which are acceptable in the product from the viewpoint of toxicity. Given that the olefins in the light naphtha fraction are all above butane, an increase in the carbon number of the aromatics will occur but the products will normally remain in the gasoline boiling range as most of the olefins present are C5 and C6 olefins. Another consequence of the alkylation is an inevitable volume decrease proportionate to the amount of benzene indicating that the reaction may be favored by the use of superatmospheric pressure; because, however, it is normally preferred to operate at pressures close to atmospheric for reasons of economy a significantly higher pressure regime which would favor equilibrium towards the alkylation will not normally be utilized. The alkylation will normally be carried out, therefore, at no more than moderate pressures as well as at relatively low temperatures.

Benzene Alkylation—Process Parameters

Pressures will normally be dependent on unit constraints but usually will not exceed about 10,000 kPag (about 1450 psig) with low to moderate pressures, normally not above 7,000 kPag (about 1,000 psig) being favored from equipment and operating considerations although higher pressures are not unfavorable, as noted above, in view of the volume change in the reaction. In most cases, the pressure will be in the range of 2000 to 5500 kPag (about 290 to 800 psig) in order to make use of existing equipment. Space velocities can be quite high, giving good catalyst utilization. Space velocities are normally in the range of 0.5 to 5 $hr^{-1}$ WHSV for the olefin feed, in most cases, 1 to 2 $hr^{-1}$ WHSV. Optimum conditions may be determined empirically, depending on feed composition, catalyst aging and unit constraints.

Two factors affecting choice of temperature will be the feed composition and the level of sulfur and other impurities. The sulfur acts as a catalyst poison at relatively low reaction temperatures, typically about 120° C., but has relatively little effect at higher temperatures about 180° C. or higher, e.g. 200° C., 220° C., so that the preferred temperature regime is above about 150° C., with temperatures above 180° C. or higher being preferred, e.g. 200° or 220° C. or higher. In general terms, the temperature will be from about 120° to 350° C. (about 250 to 660° F.) and in most cases between 150° and 250° C. (about 300 to 480° F.).

Operation may take place under vapor phase, liquid phase or supercritical phase conditions (reactor inlet). Frequently, mixed phase conditions will prevail, depending on the feed composition and the conditions used. At the reactor outlet, liquid phase will prevail under normal conditions with the product including significant proportions of $C_8$, $C_{10}$ and higher hydrocarbons. Vapor phase and liquid phase processes with preferred process configurations and process conditions are disclosed in co-pending, concurrently filed patent applications U.S. Ser. Nos. 11/362,139 and 11/362,255, both filed 27 Feb. 2006, (claiming priority from Applications Ser. Nos. 60/656,946 and 60/656,945), entitled "Liquid Phase Aromatics Alkylation Process" and "Vapor Phase Aromatics Alkylation Process" to which reference is made for a description of these processes.

If the naphtha fraction contains large proportions of benzene, it may be desirable to add olefins from external sources and in such cases, lighter olefins may be used if available. FCC off-gas may be added with the advantage that the resulting alkylaromatic products have the lower carbon numbers characteristic of the preferred gasoline aromatics. The ratio between the total olefin and aromatic feed components is normally chosen to achieve the desired process objective of benzene reduction although if this process step is used also to reduce sulfur, additional olefin may be required. Optimal conditions may therefore be determined empirically depending on feed composition, available feed rates, product objectives and unit type.

Benzene Alkylation—Catalyst

The catalysts used in the alkylation contain, as their essential catalytic component, an intermediate pore size molecular sieve. The intermediate pores size molecular sieves are a well established class and may comprises zeolites such as the aluminosilicate zeolites or other metallosilicate zeolites such as the aluminophosphosilicates and the aluminophosphates. The aluminosilicate zeolites are, however, preferred from the viewpoint of their catalytic activity and stability. Examples of intermediate pore size aluminosilicate zeolites which may be used are ZSM-5, ZSM-11 and ZSM-12. The more highly constrained intermediate pore size zeolites such as ZSM-22, ZSM-23 and ZSM-35 will not normally be preferred since their constrained pore structure does not allow the reactants and reaction products to access or to leave the internal pore structure of the zeolite. A highly favored class of intermediate pore size zeolites are those of the MWW type. The MWW family of zeolite materials has achieved recognition as having a characteristic framework structure which presents unique and interesting catalytic properties. The MWW topology consists of two independent pore systems: a sinusoidal ten-member ring [10 MR] two dimensional channel separated from each other by a second, two dimensional pore system comprised of 12 MR super cages connected to each other through 10 MR windows. The crystal system of the MWW framework is hexagonal and the molecules diffuse along the [100] directions in the zeolite, i.e., there is no communication along the c direction between the pores. In the hexagonal plate-like crystals of the MWW type zeolites, the crystals are formed of relatively small number of units along the c direction as a result of which, much of the catalytic activity is due to active sites located on the external surface of the crystals in the form of the cup-shaped cavities. In the interior structure of certain members of the family such as MCM-22, the cup-shaped cavities combine together to form a supercage. The MCM-22 family of zeolites has attracted significant scientific attention since its initial announcement by Leonovicz et al. in *Science* 264, 1910-1913 [1994] and the later recognition that the family is currently known to include a number of zeolitic materials such as PSH 3, MCM-22, MCM 49, MCM 56, SSZ 25, ERB-1, ITQ-1, and others. Lobo et al. AlChE Annual Meeting 1999, Paper 292J.

The relationship between the various members of the MCM-22 family have been described in a number of publications. Three significant members of the family are MCM-22, MCM-36, MCM-49, and MCM-56. When initially synthesized from a mixture including sources of silica, alumina, sodium, and hexamethylene imine as an organic template, the initial product will be MCM-22 precursor or MCM-56, depending upon the silica:alumina ratio of the initial synthesis mixture. At silica:alumina ratios greater than 20, MCM-22 precursor comprising H-bonded vertically aligned layers is produced whereas randomly oriented, non-bonded layers of MC-56 are produced at lower silica:alumina ratios. Both these materials may be converted to a swollen material by the use of a pillaring agent and on calcination, this leads to the laminar, pillared structure of MCM-36. The as-synthesized MCM-22 precursor can be converted directly by calcination to MCM-22 which is identical to calcined MCM-49, an intermediate product obtained by the crystallization of the randomly oriented, as-synthesized MCM-56. In MCM-49, the layers are covalently bonded with an interlaminar spacing slightly greater than that found in the calcined MCM-22/ MCM 49 materials. The unsynthesized MCM-56 may be calcined itself to form calcined MCM 56 which is distinct from calcined MCM-22/MCM-49 in having a randomly oriented rather than a laminar structure. In the patent literature MCM-22 is described in U.S. Pat. No. 4,954,325 as well as in U.S. Pat. Nos. 5,250,777; 5,284,643 and 5,382,742. MCM-49 is described in U.S. Pat. No. 5,236,575; MCM-36 in U.S. Pat. No. 5,229,341 and MCM-56 in U.S. Pat. No. 5,362,697.

The preferred zeolitic material for use in the catalyst of the present process is MCM-22 although zeolite MCM-49 may be found to have certain advantages relative to MCM-22. It has been found that the MCM-22 may be either used fresh, that is, not having been previously used as a catalyst or alternatively, regenerated MCM-22 may be used. Regenerated MCM-22 may be used after it has been used in any of the catalytic processes for which it is suitable, including the present process in which the catalyst has shown itself remain active after even multiple regenerations. It may also be possible to use MWW catalysts which have previously been used in other commercial processes and for which they are no longer acceptable, for example, MCM-22 catalyst which has previously been used for the production of aromatics such as ethylbenzene or cumene, normally using reactions such as alkylation and transalkylation. The cumene production (alkylation) process is described in U.S. Pat. No. 4,992,606 (Kushnerick et al). Ethylbenzene production processes are described in U.S. Pat. Nos. 3,751,504 (Keown); 4,547,605 (Kresge); and 4,016,218 (Haag); U.S. Pat. Nos. 4,962,256; 4,992,606; 4,954,663; 5,001,295; and 5,043,501 describe alkylation of aromatic compounds with various alkylating agents over catalysts comprising MWW zeolites such as PSH-3 or MCM-22. U.S. Pat. No. 5,334,795 describes the liquid phase synthesis of ethylbenzene with MCM-22. As noted above, MCM-22 catalysts may be regenerated after catalytic use in these processes and other aromatics production processes by conventional air oxidation techniques similar to those used with other zeolite catalysts. Conventional air oxidation techniques are also suitable when regenerating the catalysts after use in the present process.

In addition to the MWW active component, the catalysts for use in the present process will often contain a matrix material or binder in order to give adequate strength to the catalyst as well as to provide the desired porosity characteristics in the catalyst. High activity catalysts may, however, be formulated in the binder-free form by the use of suitable extrusion techniques, for example, as described in U.S. Pat. No. 4,908,120. When used, matrix materials suitably include alumina, silica, silica alumina, titania, zirconia, and other inorganic oxide materials commonly used in the formulation of molecular sieve catalysts. For use in the present process, the level of MCM-22 in a finished matrixed catalyst will be typically from 20 to 70% by weight, and in most cases from 25 to 65% by weight. In manufacture of a matrixed catalyst, the active ingredient will typically be mulled with the matrix material using an aqueous suspension of the catalyst and matrix, after which the active component and the matrix are extruded into the desired shape, for example, cylinders, hollow cylinders, trilobe, quadlobe, etc. A binder material such as clay may be added during the mulling in order to facilitate extrusion, increase the strength of the final catalytic material and to confer other desirable solid state properties. The amount of clay will not normally exceed 10% by weight of the total finished catalyst. Self-bound catalysts (alternatively referred to as unbound or binder-free catalysts), that is, catalysts which do not contain a separately added matrix or binder material, are useful and may be produced by the extrusion method described in U.S. Pat. No. 4,582,815, to which reference is made for a description of the method and of the extruded products obtained by its use. The method described there enables extrudates having high constraining strength to be produced on conventional extrusion equipment and accordingly, the method is eminently suitable for producing the high activity self-bound catalysts. The catalysts are produced by mulling the zeolite, as described in U.S. Pat. No. 4,582,815, with water to a solids level of 25 to 75 wt % in the presence of 0.25 to 10 wt % of basic material such as sodium hydroxide. Further details are to be found in U.S. Pat. No. 4,582,815. Generally, the self-bound catalysts can be characterized as particulate catalysts in the form, for instance, of extrudates or pellets, containing at least 90 wt. pct., usually at least 95 wt. pct., of the active zeolite component with no separately added binder material e.g. alumina, silica-alumina, silica, titania, zirconia etc. Extrudates may be in the conventional shapes such as cylinders, hollow cylinders, trilobe, quadlobe, flat platelets etc.

As noted above, MCM-22 and other catalysts of this family may be regenerated after catalytic use for example, in the present process or in the cumene, ethylbenzene and other aromatics production processes, with the regeneration carried out by conventional air oxidation techniques similar to those used with other zeolite catalysts. Regeneration of the catalyst after use in the present process results in only a modest activity loss, with the catalyst maintaining more than 95% of fresh activity after the first regeneration. Even after multiple regenerations, a reasonable and acceptable level of activity is retained. The catalyst has been found to maintain more than 80% of fresh activity after 6 regenerations. Following the air oxidation, the catalyst may be reconditioned by aqueous reconditioning treatment using water or a mildly alkaline solution, for example, a dilute solution of ammonia or sodium carbonate. Treatment with water alone at ambient temperatures has been found to be effective: the air-regenerated catalyst is cooled and then immersed in a water bath after which it is dried and returned to service. The reconditioning treatment may be continued for the empirically determined time which results in an improvement in catalyst properties. It is theorized that the reconditioning treatment enables the silanol groups on the surface of the zeolite to be re-formed after the regeneration treatment with a consequent restoration of catalytic properties which, in favorable cases, may provide a catalyst almost comparable to a fresh catalyst.

A guard bed may be used ahead of the beds of alkylation catalyst and, if used, will normally be the same catalyst used in the alkylation reactor as a matter of operating convenience but this is not required: if desired another catalyst or sorbent to remove contaminants from the feed may used, typically a cheaper guard bed sorbent, e.g. a used catalyst from another process or alumina. The objective of the guard bed is to remove the contaminants from the feed before the feed comes to the reaction catalyst and provided that this is achieved, there is wide variety of choice as to guard bed catalysts and conditions useful to this end. The volume of the guard bed will normally not exceed about 20% of the total catalyst bed volume of the unit.

Benzene Alkylation—Product Formation

During this part of the process, a number of mechanistically different reactions take place. The principle reactions taking place will be alkylation and transalkylation reactions between the benzene from the feed, the alkylaromatics formed in the process and the olefins present in the feed together with any added olefins. These reactions will predominate significantly over the minor degree of olefin oligomerization which may take place since the aromatics are readily sorbed onto the catalyst and preferentially occupy the catalytic sites making olefin self-condensation reactions less likely to occur as long as sufficient aromatics are present. Reaction rates and thermodynamic considerations also favor direct olefin-aromatic reactions. Some cracking may be expected to take place over the catalyst with the formation of lower carbon number species capable of effecting alkylation; normally the formation of polyalkylated products such as durene (undesirable because of its high melting point) is not a problem. Whatever the involved mechanisms are, however, a range of alkylaromatic products can be expected with varying carbon numbers.

The objective normally will be to produce fuel products having a carbon number no higher than 14 and preferably not above 12 since the most valuable gasoline fuel hydrocarbons are at $C_7$-$C_{10}$ from the viewpoint of volatility including RVP and engine operation at varying conditions. Di- and tri-alkylation is therefore preferred since with the usual $C_2$, $C_3$ and $C_4$ olefins and a predominance of benzene in the aromatic feed, alkylaromatic products with carbon numbers from about 10 to 14 are readily achievable. Depending on the feed composition, operating conditions and type of unit, the product slate may be varied with optimum conditions for any given product distribution being determined empirically.

As noted above, the alkylation may also be effective to alkylate certain sulfur species which have not been removed in any initial sulfur removal step. Alkylation does not, however, convert the sulfur to inorganic form but rather, effects a boiling range conversion to higher boiling products which can be removed subsequently in a fractionation step in the same way that oxidized sulfur species (disulfides) from a sweetening treatment are removed in order to meet product sulfur specifications.

Heavy Fraction

The main objective of the treatment of the heavy naphtha fraction is to remove sulfur and to this end an alkylation process similar to that used with the light fraction is effective. The sulfur compounds present in this fraction are mainly thiophenes and their reactivity for alkylation is high so that they are apt to be removed completely or almost so by this treatment. The process parameters used in the alkylation step are similar to those used in the alkylation step used with the light fraction, as described above, except that they may be optimized to the components which are actually present in the heavy fraction. In this way, the process as a whole achieves optimal treatment of the entire feed range. Optimum conditions may be determined empirically, depending on feed composition, catalyst aging and unit constraints. The alkylation process will work with this fraction without octane loss, possibly with some octane increase due to isomerization of olefins.

As with the light fraction a preliminary non-hydrogenative desulfurization may be carried out so as to preserve feed olefins for the alkylation. With this fraction, however, the selective naphtha hydrofining process described in various patents including U.S. Pat. No. 5,985,136; U.S. Pat. No.

6,126,184; U.S. Pat. No. 6,231,753; 6,409,913; U.S. Pat. No. 6,231,754; U.S. Pat. No. 6,013,598; U.S. Pat. No. 6,387,249; U.S. Pat. No. 6,596,157 is particularly useful. The ExxonMobil selective naphtha hydrofining process, SCANfining™ which incorporates aspects of the processes described in these patents, is commercially available from ExxonMobil Research and Engineering Company and is an excellent choice for this application since it is more capable of removing the higher boiling sulfur compounds in the HCN than the non-catalytic mercaptan extraction processes which are more effective in removing the mercaptan sulfur from the LCN without significant octane loss in the fraction. By contrast, the thiophenic sulfur compounds in the HCN are amenable to removal by alkylation with the naphtha olefins, possibly with some octane increase due to isomerization of olefins. If a refinery already has a selective naphtha hydrofining process unit and wishes to go to higher levels of sulfur removal, e.g. higher than 95%, at which some octane loss does take place with the hydrofining process, the combined sequence of the hydrofining unit up to its optimal level for hydrodesulfurization relative to octane loss, e.g. 85% HDS, followed by removal of residual sulfur in the alkylation reactor will normally be preferred.

Product Recovery and Treatment

After treatment in the alkylation process modules, the two naphtha fractions are recombined for recovery of the product gasoline. Stabilization to remove light ends formed in the processing is typical as well as fractionation to separate the gasoline from heavier fractions formed in the alkylation step and any higher boiling sulfur compounds formed in the sweetening step (if used). At this time, the product specifications need to be observed in order to obtain proper flash point, boiling point and other specifications.

EXAMPLE

Figure 2:
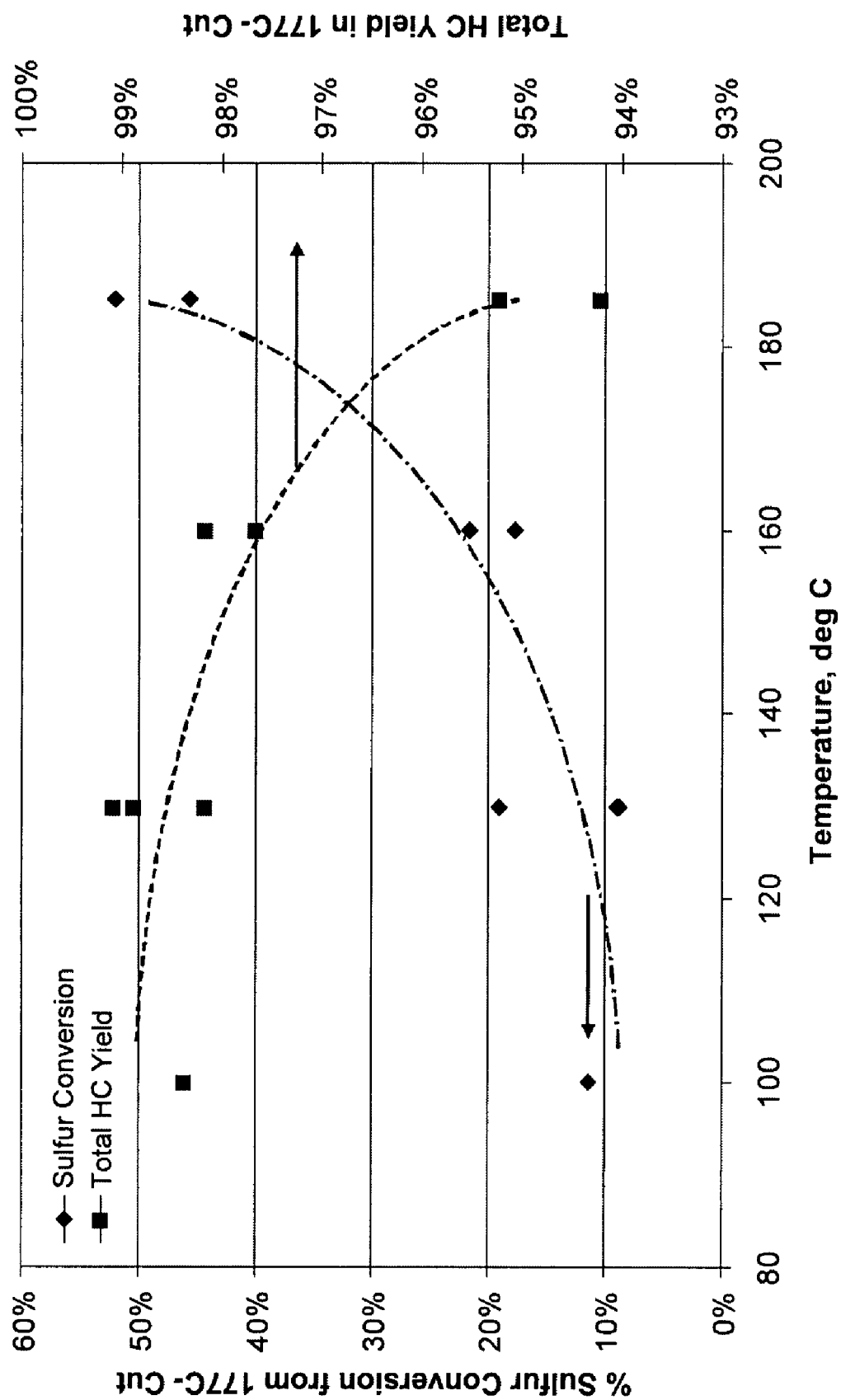
FIG. 2 is a graph showing the sulfur and conversion hydrocarbon yields from treatment of a naphtha with a zeolite catalyst as described in the Example.
Figure 3:
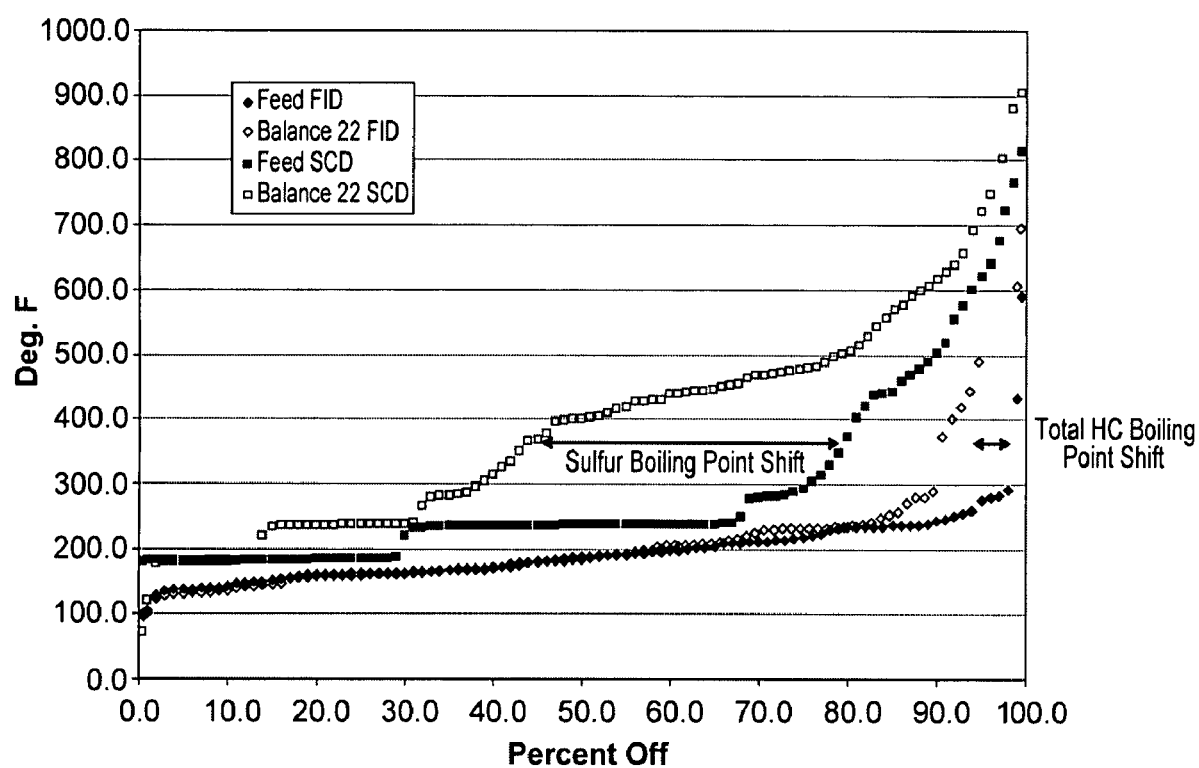
FIG. 3 is a graph showing the hydrocarbon and boiling point shifts resulting from the treatment described in the Example.

The effectiveness of the alkylation step for removing sulfur from the gasoline fraction was demonstrated using a narrow cut intermediate ($C_6$-$C_8$) catalytic naphtha fraction containing 49% olefins, 12% aromatics, 360 wppm sulfur. The nitrogen content was reduced to about 1 wppm by treatment with an ion exchange resin (Amberlyst™) and alumina. This fraction was passed without treat gas over an MCM-49 catalyst diluted 4:1 with inerts, in an upflow reactor. The pressure (total system, gauge) was held at 6200 kPag (900 psig) and space velocity at 5 $hr^{-1}$ v/v; the temperature was varied upwards during the course of the 11 day run during which 2 mass balances were taken each day. A 177° C.– (350° F.–) product fraction was taken and the sulfur conversion from this fraction determined. FIG. 2 shows that the sulfur conversion out of the product fraction increases with temperature and that the total hydrocarbon yield decreases. Similar results were obtained with a 204° C.– (400° F.–) fraction. FIG. 3 shows the hydrocarbon and boiling point shifts resulting from the treatment at a temperature of 185° C. (365° F.) attained at end-of-run when Mass Balance 22 was taken after 11 days of operation; it shows that while the shift in boiling point of the hydrocarbons is relatively limited (compare the boiling point shift between lines "Feed FID" and "Balance 22 FID"), a significantly greater shift in the boiling points of the sulfur species is obtained (compare the boiling point shift between lines "Feed SCD" and "Balance 22 SCD"), demonstrating that a subsequent fractionation will be readily capable of separating the alkylated sulfur compounds from the hydrocarbon components.

The invention claimed is:

1. A process for the removal of sulfur compounds and benzene of a catalytically cracked petroleum naphtha comprising benzene, organic sulfur compounds and olefins, which comprises:
    Fractionating the cracked naphtha into a relatively low boiling range, olefinic, light catalytic naphtha (LCN) and an olefinic heavy catalytic naphtha (HCN) which boils above the range of the LCN the boiling ranges of the LCN and the HCN being defined by a cut point selected to maintain most of the benzene in the cracked naphtha in the LCN together with olefins in the boiling range of the LCN;
    Subjecting the LCN to a fixed bed alkylation step in which the benzene in the LCN is alkylated with the olefins contained in this fraction to produce an alkylated benzene LCN fraction;
    Subjecting the HCN to another fixed bed alkylation step using the olefins contained in this fraction to alkylate the sulfur compounds, forming alkylated sulfur products which boil above the gasoline boiling range in the alkylated sulfur HCN fraction.

2. A process according to claim 1 in which the LCN is subjected to a preliminary non-hydrogenative desulfurization step.

3. A process according to claim 2 in which the desulfurization step comprises a mercaptan extraction step.

4. A process according to claim 2 in which the desulfurization step comprises a mercaptan oxidation step to convert mercaptans to disulfides.

5. A process according to claim 1 in which the olefins contained in the LCN comprise principally C4 and C5 olefins.

6. A process according to claim 1 in which the LCN and the HCN are subjected to alkylation over separate fixed beds of zeolite alkylation catalyst.

7. A process according to claim 6 in which the LCN is subjected to alkylation over a zeolite alkylation catalyst comprising an intermediate pore size zeolite.

8. A process according to claim 7 in which the LCN is subjected to alkylation over a zeolite alkylation catalyst comprising ZSM-5 or ZSM-12.

9. A process according to claim 7 in which the LCN is subjected to alkylation over a zeolite alkylation catalyst comprising a zeolite of the MWW family.

10. A process according to claim 9 in which the zeolite of the MWW family comprises MCM-22 or MCM-49.

11. A process according to claim 1 in which the alkylated LCN fraction and the alkylated HCN fraction are fractionated to remove benzene alkylation products formed in the alkylation steps boiling above the gasoline boiling range.

12. A process according to claim 1 in which the HCN is subjected to a preliminary non-hydrogenative desulfurization step before the alkylation step.

13. A process according to claim 12 in which the HCN is subjected to a desulfurization step comprises a selective catalytic naphtha hydrotreating step.

14. A process according to claim 1 in which the HCN is subjected to alkylation over a zeolite alkylation catalyst comprises an intermediate pore size zeolite.

15. A process according to claim 14 in which the HCN is subjected to alkylation over a zeolite alkylation catalyst comprises ZSM-5 or ZSM-12.

16. A process according to claim 7 in which the HCN is subjected to alkylation over a zeolite alkylation catalyst comprises a zeolite of the MWW family.

17. A process according to claim 9 in which the HCN is subjected to alkylation over a zeolite of the MWW family comprises MCM-22 or MCM-49.

18. A process according to claim 1 in which the light and heavy fractions are separated by the fractionation such that at least 90 volume percent of the benzene in the cracked naphtha is retained in the LCN.

19. A process according to claim 18 in which the light and heavy fractions are separated by the fractionation such that the thiophene is retained in the HCN.

20. A process according to claim 18 in which the light and heavy fractions are separated by the fractionation at a cut point from 81° to 84° C.

* * * * *